US012223970B2

(12) United States Patent
Sung et al.

(10) Patent No.: US 12,223,970 B2
(45) Date of Patent: Feb. 11, 2025

(54) ENCODING METHOD, DECODING METHOD, ENCODER FOR PERFORMING ENCODING METHOD, AND DECODER FOR PERFORMING DECODING METHOD

(71) Applicant: Electronics and Telecommunications Research Institute, Daejeon (KR)

(72) Inventors: Jongmo Sung, Daejeon (KR); Seung Kwon Beack, Daejeon (KR); Tae Jin Lee, Daejeon (KR); Woo-taek Lim, Daejeon (KR); Inseon Jang, Daejeon (KR); Byeongho Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 75 days.

(21) Appl. No.: 18/103,993

(22) Filed: Jan. 31, 2023

(65) Prior Publication Data

US 2023/0317089 A1 Oct. 5, 2023

(30) Foreign Application Priority Data

Mar. 29, 2022 (KR) ........................ 10-2022-0038865

(51) Int. Cl.
*G10L 19/087* (2013.01)
*G10L 19/038* (2013.01)
(Continued)

(52) U.S. Cl.
CPC ............ *G10L 19/13* (2013.01); *G10L 19/038* (2013.01); *G10L 25/30* (2013.01); *G10L 19/02* (2013.01); *G10L 19/087* (2013.01)

(58) Field of Classification Search
CPC .............................. G10L 19/087; G10L 19/02
See application file for complete search history.

(56) References Cited

U.S. PATENT DOCUMENTS 5,737,716 A * 4/1998 Bergstrom .............. G10L 19/02 704/E19.01
2003/0097260 A1* 5/2003 Griffin .................. G10L 19/087 704/230

(Continued)

FOREIGN PATENT DOCUMENTS

KR 10-1910273 10/2018
KR 10-2020-0039530 4/2020

OTHER PUBLICATIONS

Zhen et al., "Cascaded Cross-Module Residual Learning towards Lightweight End-to-End Speech Coding", INTERSPEECH, Sep. 2019, pp. 3396-3400.

(Continued)

*Primary Examiner* — Feng-Tzer Tzeng
(74) *Attorney, Agent, or Firm* — KILE PARK REED & HOUTTEMAN PLLC

(57) ABSTRACT

An encoding method, a decoding method, an encoder for performing the encoding method, and a decoder for performing the decoding method are provided. The encoding method includes outputting LP coefficients bitstream and a residual signal by performing an LP analysis on an input signal, outputting a first latent signal obtained by encoding a periodic component of the residual signal, a second latent signal obtained by encoding a non-periodic component of the residual signal, and a weight vector for each of the first latent signal and the second latent signal, using a first neural network module, and outputting a first bitstream obtained by quantizing the first latent signal, a second bitstream obtained by quantizing the second latent signal, and a weight bitstream obtained by quantizing the weight vector, using a quantization module.

10 Claims, 8 Drawing Sheets

(51) Int. Cl.

| | |
|---|---|
| ***G10L 19/13*** | (2013.01) |
| ***G10L 25/30*** | (2013.01) |
| *G10L 19/02* | (2013.01) |

(56) References Cited

U.S. PATENT DOCUMENTS

| | | | |
|---|---|---|---|
| 2021/0005208 | A1 | 1/2021 | Beack et al. |
| 2021/0074306 | A1 | 3/2021 | Sung et al. |
| 2021/0142812 | A1 | 5/2021 | Kim et al. |

OTHER PUBLICATIONS

Kankanahalli, "End-to-End Optimized Speech Coding With Deep Neural Networks", ICASSP, 2018, pp. 2521-2525.

Yang et al., "Feedback Recurrent Autoencoder", ICASSP, 2020, pp. 3347-3351.

* cited by examiner

ENCODING METHOD, DECODING METHOD, ENCODER FOR PERFORMING ENCODING METHOD, AND DECODER FOR PERFORMING DECODING METHOD

CROSS-REFERENCE TO RELATED APPLICATION

This application claims the benefit of Korean Patent Application No. 10-2022-0038865 filed on Mar. 29, 2022, in the Korean Intellectual Property Office, the entire disclosure of which is incorporated herein by reference for all purposes.

BACKGROUND

1. Field of the Invention

One or more example embodiments relate to an encoding method, a decoding method, an encoder for performing the encoding method, and a decoder for performing the decoding method.

2. Description of the Related Art

With the development of deep learning technologies, deep learning technologies are being used in various fields such as speech, audio, language and video signal processing.

A code-excited linear prediction (CELP) method is being used for compression and reconstruction of a speech signal, and a perceptual audio coding method based on a psychoacoustic model is being used for compression and reconstruction of an audio signal.

In addition, a method of encoding and decoding speech and audio signals based on a deep autoencoder has been proposed.

SUMMARY

A feedforward-type autoencoder scheme has been widely used to encode non-sequential signals such as still image efficiently, but may be inefficient in encoding sequential signals with periodicity such as speech or audio signals. A recurrent-type autoencoder scheme may be effective in modeling a temporal structure of a signal based on a recurrent neural network (RNN) suitable for sequential signal modeling, but may be inefficient in encoding signals with a non-periodic component. Various example embodiments may provide an encoding method, a decoding method, an encoder, and a decoder that may enhance a quality of a reconstructed signal and a compression efficiency by efficiently encoding both periodic and non-periodic component of a sequential signal such as a speech and a music signal.

Example embodiments may provide an encoding method, a decoding method, an encoder, and a decoder including a combined structure of a dual-path neural network and a gating neural network.

According to an aspect, there is provided an encoding method includes outputting linear prediction (LP) coefficients bitstream and a residual signal by performing a LP analysis on an input signal, outputting a first latent signal obtained by encoding a periodic component of the residual signal, a second latent signal obtained by encoding an non-periodic component of the residual signal, and a weight vector for each of the first latent signal and the second latent signal computed from the residual signal, using a first neural network module, and outputting a first bitstream obtained by quantizing the first latent signal, a second bitstream obtained by quantizing the second latent signal, and a weight bitstream obtained by quantizing the weight vector, using a quantization module.

The outputting of the LP coefficients bitstream and the residual signal may include calculating LP coefficients from the input signal, outputting the LP coefficients bitstream by quantizing the LP coefficients, determining quantized LP coefficients by de-quantizing the LP coefficients bitstream, and calculating the residual signal by feeding the input signal into an LP analysis filter with the quantized LP coefficients.

The outputting of the first latent signal, the second latent signal and the weight vector may include outputting the first latent signal obtained by encoding the residual signal, using a first neural network, outputting the second latent signal obtained by encoding the residual signal, using a second neural network, and outputting the weight vector obtained by feeding the residual signal into a third neural network.

The first neural network may include an RNN configured to encode a periodic component of the residual signal. The second neural network may include a feedforward neural network (FNN) configured to encode a non-periodic component of the residual signal. The third neural network may include a neural network configured to output a weight vector according to characteristics of the residual signal.

According to another aspect, there is provided a decoding method includes outputting quantized LP coefficients, a first quantized latent signal, a second quantized latent signal, and a quantized weight vector by de-quantizing LP coefficients bitstream, the first bitstream, the second bitstream, and the weight bitstream, respectively using de-quantization module, outputting a first decoded residual signal obtained by decoding the first quantized latent signal and a second decoded residual signal obtained by decoding the second quantized latent signal, using a second neural network module, reconstructing a residual signal using the first decoded residual signal, the second decoded residual signal, and the quantized weight vector, and synthesizing an output signal by feeding the residual signal into an LP synthesis filter with the quantized LP coefficients.

The outputting of the first decoded residual signal and the second decoded residual signal may include outputting the first decoded residual signal obtained by decoding the first quantized latent signal, using a fourth neural network, and outputting the second decoded residual signal obtained by decoding the second quantized latent signal, using a fifth neural network.

The fourth neural network may include an RNN configured to decode a periodic component of the residual signal, and the fifth neural network may include an FNN configured to decode a non-periodic component of the residual signal.

The reconstructing of the residual signal may include outputting the reconstructed residual signal based on a weighted sum of the first decoded residual signal and the second decoded residual signal, using the quantized weight vector.

According to another aspect, there is provided an encoder includes a processor. The processor may be configured to output LP coefficients bitstream and a residual signal by performing an LP analysis on an input signal, using an LP analysis module, output a first latent signal obtained by encoding a periodic component of the residual signal, a second latent signal obtained by encoding a non-periodic component of the residual signal, and a weight vector for each of the first latent signal and the second latent signal from the residual signal, using a first neural network module, and output a first bitstream obtained by quantizing the first latent signal, a second bitstream obtained by quantizing the second latent signal, and a weight bitstream obtained by quantizing the weight vector, using a quantization module.

The processor may be configured to calculate LP coefficients for the input signal, using LP coefficients calculator, output the LP coefficients bitstream by quantizing the LP coefficients using LP coefficients quantizer, output quantized LP coefficients by de-quantizing the LP coefficients bitstream using LP coefficients de-quantizer, and calculate the residual signal by feeding the input signal into an LP analysis filter with the quantized LP coefficients.

The processor may be configured to output the first latent signal obtained by encoding the residual signal, using a first neural network, output the second latent signal obtained by encoding the residual signal, using a second neural network, and output the weight vector obtained by feeding the residual signal into a third neural network.

The first neural network may include an RNN configured to encode a periodic component of the residual signal. The second neural network may include an FNN configured to encode a non-periodic component of the residual signal. The third neural network may include a neural network configured to output a weight vector according to characteristics of the residual signal.

According to another aspect, there is provided a decoder includes a processor. The processor may be configured to output quantized LP coefficients, a first quantized latent signal, a second quantized latent signal, and a quantized weight vector by de-quantizing LP coefficients bitstream, the first bitstream, the second bitstream, and the weight bitstream, respectively, output a first decoded residual signal obtained by decoding the first quantized latent signal and a second decoded residual signal obtained by decoding the second quantized latent signal, using a second neural network module, reconstruct a residual signal based on the first decoded residual signal, the second decoded residual signal, and the quantized weight vector, using a residual signal synthesis module, and synthesize an output signal by feeding the residual signal into an LP synthesis filter with the quantized LP coefficients.

The processor may be configured to output the first decoded residual signal obtained by decoding the first quantized latent signal, using a fourth neural network, and output the second decoded residual signal obtained by decoding the second quantized latent signal, using a fifth neural network.

The fourth neural network may include an RNN configured to decode a periodic component of the residual signal, and the fifth neural network may include an FNN configured to decode a non-periodic component of the residual signal.

The processor may be configured to output the reconstructed residual signal based on a weighted sum of the first decoded residual signal and the second decoded residual signal, using the quantized weight vector.

Additional aspects of example embodiments will be set forth in part in the description which follows and, in part, will be apparent from the description, or may be learned by practice of the disclosure.

According to example embodiments, to separately perform modeling of periodic components and non-periodic components of speech and audio signals, two neural networks having different attributes in an LP analysis and synthesis framework may be connected through a gating neural network, and thus it may be possible to enhance a compression efficiency and a reconstruction quality of speech and audio signals in comparison to an existing code-excited linear prediction (CELP) and single-path auto-encoder scheme.

According to example embodiments, inherent features of signals such as speech and music may be normalized in advance through spectral flattening according to an LP analysis, and thus a dual-path neural network model for encoding and decoding of an LP residual signal may obtain an robust effect to signals with various characteristics.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
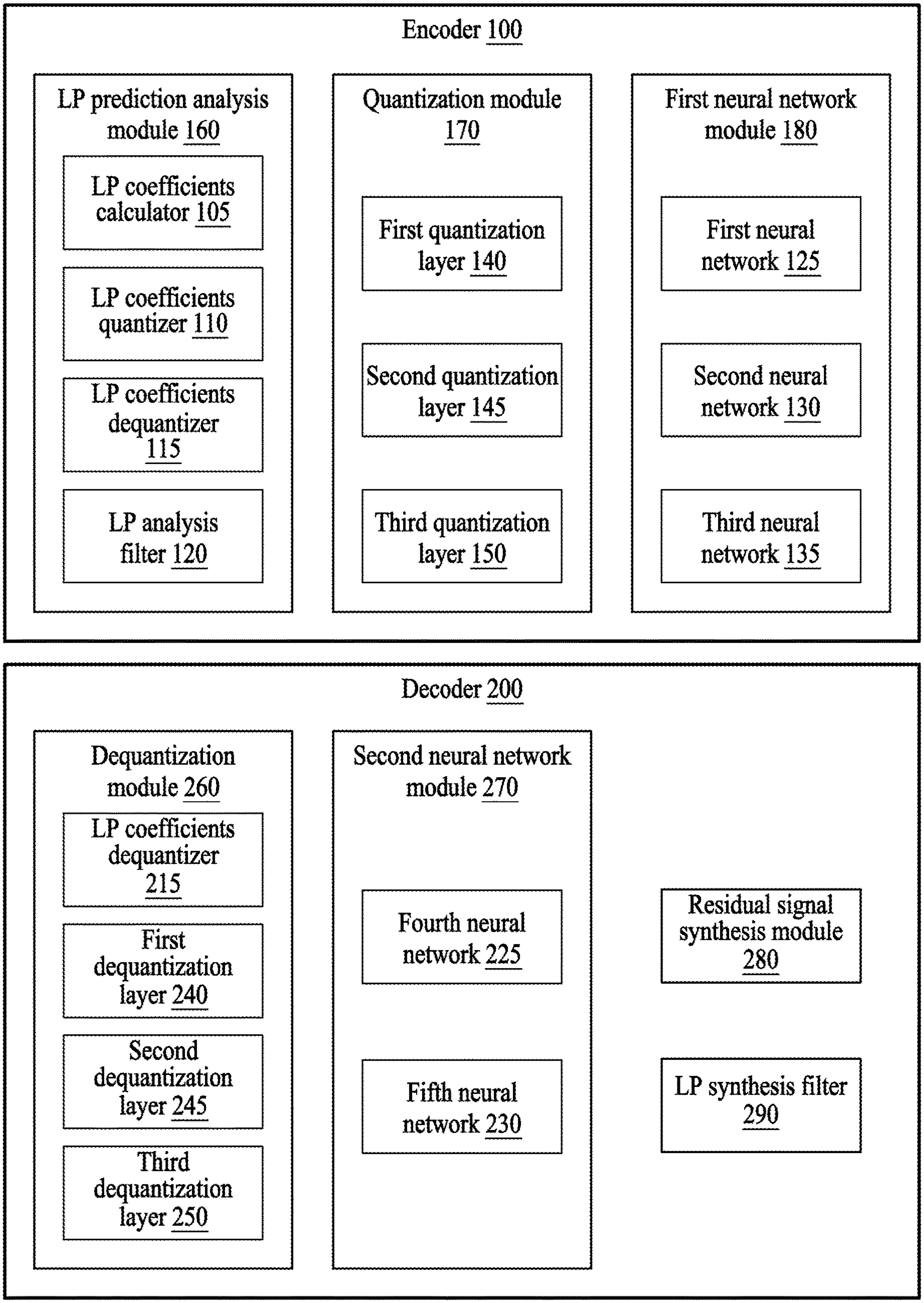
FIG. 1 is a block diagram illustrating an encoder and a decoder according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like components and a repeated description related thereto will be omitted. In the description of example embodiments, detailed description of well-known related structures or functions will be omitted when it is deemed that such description will cause ambiguous interpretation of the present disclosure.

FIG. 1 is a block diagram illustrating an encoder 100 and a decoder 200 according to an example embodiment.

Referring to FIG. 1, the encoder 100 may include an LP analysis module 160, a quantization module 170, and a first neural network module 180. The decoder 200 may include an inverse quantization module 260, a second neural network module 270, a residual signal synthesis module 280, or a linear prediction synthesis filter 290.

Referring to FIG. 1, the encoder 100 may output a first bitstream and a second bitstream obtained by encoding a residual signal of an audio signal or speech signal, which is an input signal. The encoder 100 may also output LP coefficients bitstream obtained by quantizing LP coefficients, and a weight bitstream obtained by quantizing a weight vector.

The decoder 200 may output an output signal obtained by reconstructing an input signal, using the first bitstream, the second bitstream, the LP coefficients bitstream, and the weight bitstream that are received from the encoder 100.

For example, a processor of the encoder 100 may output LP coefficients bitstream and a residual signal by performing an LP analysis on the input signal using the LP analysis module 160.

In an example, the LP analysis module 160 may include LP coefficients calculator 105, LP coefficients quantizer 110, LP coefficients de-quantizer 115, or an LP analysis filter 120.

For example, the processor of the encoder 100 may calculate LP coefficients for each frame corresponding to an analysis unit of the input signal, using the LP coefficients calculator 105.

For example, the processor of the encoder 100 may input the LP coefficients to the LP coefficients quantizer 110 and may allow the LP coefficients quantizer 110 to output LP coefficients bitstream.

For example, the processor of the encoder 100 may calculate quantized LP coefficients by de-quantizing the LP coefficients bitstream using the LP coefficients de-quantizer 115.

For example, the processor of the encoder 100 may calculate a residual signal from the input signal using the LP analysis filter 120 with the quantized LP coefficients.

In an example, the processor of the encoder 100 may output a first latent signal, a second latent signal, and a weight vector for each of the first latent signal and the second latent signal from the residual signal, using the first neural network module 180.

For example, the first neural network module 180 may include a first neural network 125, a second neural network 130, or a third neural network 135. For example, the processor of the encoder 100 may input the residual signal to the first neural network 125 or the second neural network 130, and may allow the first neural network 125 or the second neural network 130 to output the first latent signal or the second latent signal. The first latent signal or the second latent signal may refer to an encoded code vector or bottleneck.

For example, the processor of the encoder 100 may input the residual signal to the third neural network 135, and may allow the third neural network 135 to output the weight vector.

In an example, the processor of the encoder 100 may output a first bitstream obtained by quantizing the first latent signal, a second bitstream obtained by quantizing the second latent signal, and a weight bitstream obtained by quantizing the weight vector, using the quantization module 170.

In an example, the quantization module 170 may include a first quantization layer 140, a second quantization layer 145, or a third quantization layer 150.

For example, the processor of the encoder 100 may quantize the first latent signal output from the first neural network 125 and output the first bitstream, using the first quantization layer 140.

For example, the processor of the encoder 100 may quantize the second latent signal output from the second neural network 130 and output the second bitstream, using the second quantization layer 145.

For example, the processor of the encoder 100 may quantize the weight vector output from the third neural network 135 and output the weight bitstream, using the third quantization layer 150.

In an example, a processor of the decoder 200 may de-quantize the LP coefficients bitstream, the first bitstream, the second bitstream, and the weight bitstream and output quantized LP coefficients, a first quantized latent signal, a second quantized latent signal, and a quantized weight vector, using the de-quantization module 260.

In an example, the de-quantization module 260 may include LP coefficients de-quantizer 215, a first de-quantization layer 240, a second de-quantization layer 245, or a third de-quantization layer 250.

For example, the processor of the decoder 200 may output quantized LP coefficients by de-quantizing an LP coefficients bitstream using the LP coefficients de-quantizer 215.

For example, the processor of the decoder 200 may output a first quantized latent signal by de-quantizing an first bitstream using the first de-quantization layer 240.

For example, the processor of the decoder 200 may output a second quantized latent signal by de-quantizing an second bitstream using the second de-quantization layer 245.

For example, the processor of the decoder 200 may output a quantized weight vector by de-quantizing a weight bitstream using the third de-quantization layer 250.

In an example, the processor of the decoder 200 may output a first decoded residual signal obtained by decoding the first quantized latent signal and a second decoded residual signal obtained by decoding the second quantized latent signal, using the second neural network module 270.

For example, the second neural network module 270 may include a fourth neural network 225 or a fifth neural network 230. For example, the processor of the decoder 200 may input the first quantized latent signal to the fourth neural network 225, and may allow the fourth neural network 225 to output the first decoded residual signal obtained by decoding the first quantized latent signal. For example, the processor of the decoder 200 may input the second quantized latent signal to the fifth neural network 230 and may allow the fifth neural network 230 to output the second decoded residual signal obtained by decoding the second quantized latent signal.

The first neural network 125 and the fourth neural network 225 may refer to an encoder and a decoder of an autoencoder having a recurrent structure suitable for modeling a periodic component of a speech signal or an audio signal. For example, the first neural network 125 may allow an input layer to output a code vector, i.e., a first latent signal, using an input signal. The code vector may generally refer to a dimensionality-reduced representation of a input signal under the constraint that an input signal and an output signal of the autoencoder may be the same. The fourth neural network 225 may output a reconstructed signal, using the code vector output from the first neural network 125. A signal output from the fourth neural network 225 may refer to a reconstructed signal of the input signal to the first neural network 125. The principles of the autoencoder of the first neural network 125 and the fourth neural network 225 may apply equally to an autoencoder of the second neural network 130 and the fifth neural network 230. However, an autoencoder with a pair of the second neural network 130 and the fifth neural network 230 may have a feedforward structure suitable for modeling non-periodic components of speech or audio signals.

In an example, the processor of the decoder 200 may synthesize the residual signal based on the first decoded residual signal, the second decoded residual signal, and the quantized weight vector, using the residual signal synthesis module 280. The residual signal synthesized by the residual signal synthesis module 280 may refer to a signal obtained by reconstructing the residual signal output from the LP analysis filter 120 of the encoder 100.

For example, the processor of the decoder 200 may synthesize an output signal based on the reconstructed residual signal and the quantized LP coefficients, using the LP synthesis filter 290. The reconstructed residual signal synthesized by the residual signal synthesis module 280 and the quantized LP coefficients from the de-quantization module 260 may be fed into the LP synthesis filter 290. The output signal synthesized by the LP synthesis filter 290 may refer to a signal obtained by reconstructing the input signal of the encoder 100.

Example embodiments provide an encoding method and a decoding method for enhancing an encoding quality in an encoding process of sequential signals such as audio signals or speech signals and for preventing overfitting of a neural network model that encodes or decodes a residual signal. According to an example embodiment, the encoder 100 may perform modeling of the residual signal through a dual-path neural network. The first neural network 125 may include a recurrent neural network (RNN) configured to perform modeling of a periodic component using the input residual signal. The second neural network 130 may include an FNN configured to perform modeling of a non-periodic component using the input residual signal. The third neural network 135 may output a weight vector dependent on signal characteristics to reconstruct a residual signal as a weighted sum of the first decoded residual signal and the second decoded residual signal output from the fourth neural network 225 and the fifth neural network 230, respectively.

The block diagram of the encoder 100 and the decoder 200 is shown in FIG. 1 for convenience of description, and components of the encoder 100 and the decoder 200 shown in FIG. 1 may refer to software or programs executable by the processor.

Figure 2:
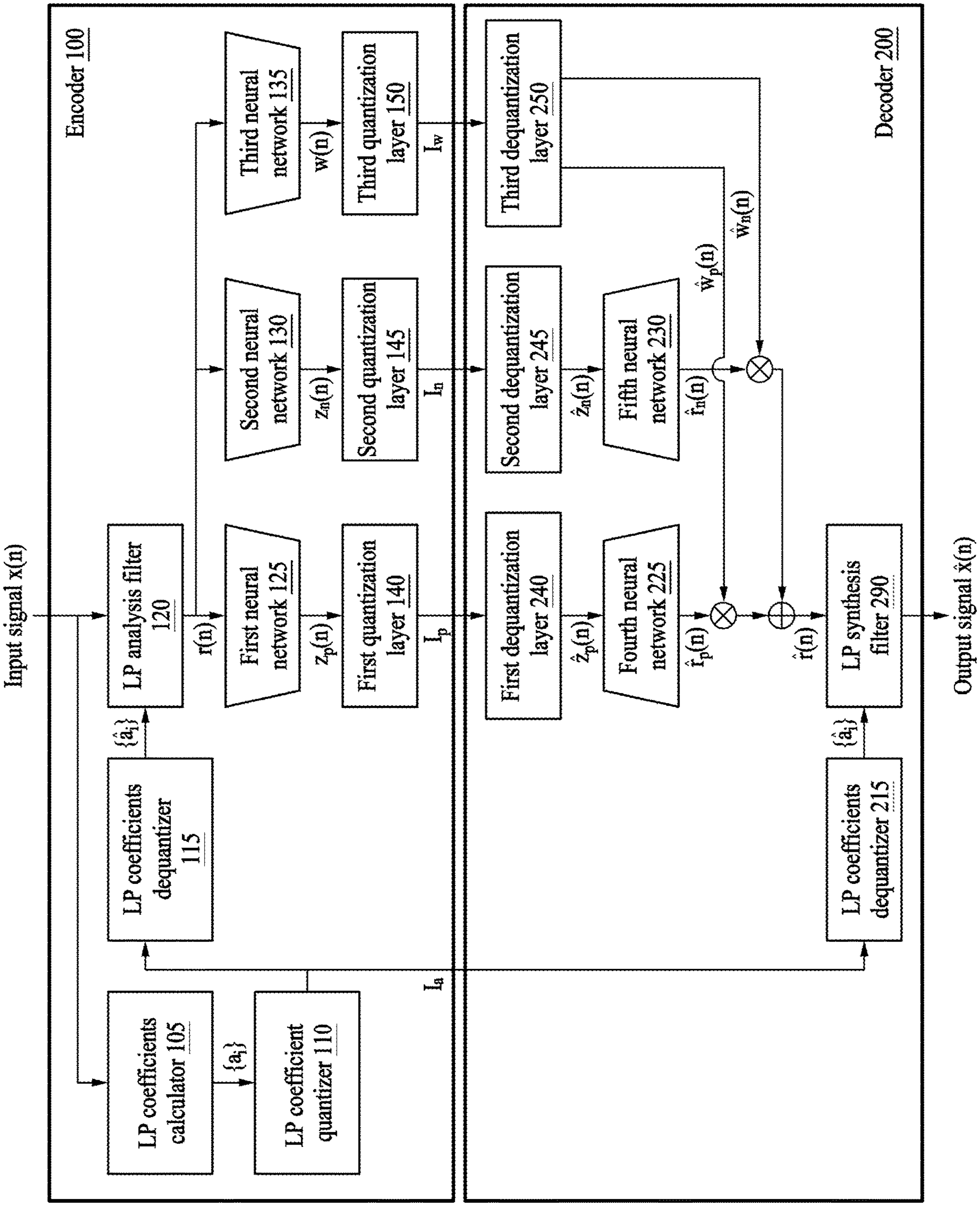
FIG. 2 is a diagram illustrating operations of an encoder and a decoder according to an example embodiment.

FIG. 2 is a diagram illustrating operations of the encoder 100 and the decoder 200 according to an example embodiment.

The processor of the encoder 100 may calculate LP coefficients $\{a_i\}$ based on an input signal x(n), using the LP coefficients calculator 105. A linear prediction may refer to predicting a current sample as a linear combination of past samples, and the LP coefficients calculator 105 may calculate LP coefficients based on samples in an LP analysis frame. The processor of the encoder 100 may calculate p-th order LP coefficients $\{a_i\}_{i=1, \ldots, p}$ to minimize the prediction error E as shown in Equation 2 below using the LP coefficients calculator 105. Typically, the LP coefficients are calculated using autocorrelation method and Durbin's recursive algorithm to solve the minimization problem efficiently.

$$\tilde{x}(n)=\Sigma_{i=1}^{P} a_i x(n-i),\ n=0, \ldots, (N_{LP}-1) \quad \text{[Equation 1]}$$

In Equation 1, $\tilde{x}(n)$ denotes the predicted signal, and $N_{LP}$ denotes a number of samples in an LP analysis frame.

$$E=\Sigma_{n=0}^{NLP-1}\{e(n)\}^2=\Sigma_{n=0}^{NLP-1}\{x(n)-\tilde{x}(n)\}^2 \quad \text{[Equation 2]}$$

In Equation 2, x(n) denotes an input signal, and $\tilde{x}(n)$ denotes the predicted input signal of Equation 1.

The processor of the encoder 100 may quantize the LP coefficients and output LP coefficients bitstream $I_a$, using the LP coefficients quantizer 110. If the LP coefficients is directly quantized, the LP synthesis filter 290 of the decoder 200 for synthesizing an output signal may become unstable due to a quantization error. To prevent the LP synthesis filter 290 from being unstable, the processor of the encoder 100 may convert the LP coefficients into, for example, a line spectral frequency (LSF) or an immittance spectral frequency (ISF), etc., to quantize the LP coefficients, using the LP coefficients quantizer 110.

The processor of the encoder 100 may de-quantize LP coefficients bitstream and may output quantized LP coefficients $\{\hat{a}_i\}$, using the LP coefficients de-quantizer 115.

The processor of the encoder 100 may calculate a residual signal r(n) based on the quantized LP coefficients $\{\hat{a}_i\}$ and the input signal x(n), using the LP analysis filter 120. The residual signal r(n) may be calculated using the LP analysis filter 120 as shown in Equation 3 below.

$$r(n)=x(n)+\Sigma_{i=1}^{P}\hat{a}_i x(n-i),\ n=0, \ldots, (N-1) \quad \text{[Equation 3]}$$

In Equation 3, N denotes a number of samples in an analysis frame.

The encoder 100 may reduce a dynamic range of an input signal and may obtain a spectrally-flattened residual signal through an LP analysis.

The LP analysis may be applied to an audio signal as well, and may refer to a process of extracting a residual signal and LP coefficients from an audio signal. A scheme of extracting LP coefficients is not limited to a specific example, and it is apparent to one of ordinary skill in the art that various schemes of extracting LP coefficients may be applied without departing from the spirit of the present disclosure.

The processor of the encoder 100 may input the residual signal r(n) to the first neural network 125 and may allow the first neural network 125 to output a first latent signal $z_p$ (n) of the residual signal. The first latent signal may refer to a code vector which is a dimensionality-reduced representation under the constraint that an input signal of the first neural network 125 and an output signal of the fourth neural network 225 are the same. For example, the first neural network 125 may output the first latent signal that is a code vector obtained by encoding the residual signal.

The processor of the encoder 100 may input the residual signal r(n) to the second neural network 130 and may allow the second neural network 130 to output a second latent signal $z_n$(n) of the residual signal. The second latent signal may refer to a code vector which is a dimensionality-representation under the constraint that an input signal of the second neural network 130 and an output signal of the fifth neural network 230 are the same. For example, the second neural network 130 may output the second latent signal that is a code vector obtained by encoding the residual signal.

The first neural network 125 may be a neural network model configured to perform modeling of a periodic component of the residual signal, and the second neural network 130 may be a neural network model configured to perform modeling of a non-periodic component of the residual signal.

A training model may be a neural network model that includes one or more layers and one or more model parameters based on deep learning. However, there is no limitation to the type of neural network models used herein, a size of input/output data.

The processor of the encoder 100 may input the residual signal r(n) to the third neural network 135, and may allow the third neural network 135 to output a weight vector w(n) calculated from the residual signal. The weight vector may refer to weighting values used for calculating a reconstructed residual signal $\hat{r}(n)$ as a weighted sum of two decoded outputs, for example, a first decoded residual signal $\hat{r}_p(n)$ and a second decoded residual signal $\hat{r}_n(n)$, output from the fourth neural network 225 and the fifth neural network 230 of the decoder 200, respectively.

$$w=\mathcal{F}_{gate}(r;\mathbb{W}_{gate}) \quad \text{[Equation 4]}$$

For example, the third neural network 135 may output a weight vector w as shown in Equation 4. In Equation 4, $\mathbb{W}_{gate}$ denotes a model parameter of the third neural network 135, and r denotes a residual signal in vector form inputted to the third neural network 135.

The processor of the encoder 100 may output a first bitstream $I_p$, a second bitstream $I_n$, and a weight bitstream $I_w$ obtained by quantizing a first latent signal $z_p(n)$, a second latent signal $z_n(n)$, and a weight vector w(n), using the first quantization layer 140, the second quantization layer 145, and the third quantization layer 150, respectively.

The encoder 100 may multiplex the first bitstream $I_p$, the second bitstream $I_n$, the weight bitstream $I_w$ and LP coefficients bitstream $I_a$, and transmit the multiplexed bitstreams to the decoder 200.

To transmit the first latent signal $z_p(n)$, the second latent signal $z_n(n)$, and the weight vector w(n) to the decoder 200 to the decoder 200, the encoder 100 may perform a quantization process in the first quantization layer 140, the second quantization layer 145, and the third quantization layer 150. Since quantization process may be generally non-differentiable or may have discontinuous derivative values, the general quantization process may not be suitable for training a neural network model by updating model parameters based on a loss function. In the training phase of neural network models (e.g., the first neural network 125 through the fifth neural network 230), a quantization process may be replaced with a continuous approximated quantization which can be differentiable. In the test phase of trained neural network models (e.g., the first neural network 125 through the fifth neural network 230), the encoder 100 and the decoder 200 may perform a typical quantization and dequantization process. For example, a softmax quantization scheme, a uniform noise addition scheme, and the like may be used to approximate a quantization process to be differentiable, however, the example embodiments are not limited thereto.

The decoder 200 may receive the multiplexed bitstreams from the encoder 100, may demultiplex each bitstream, and may output the first bitstream $I_p$, the second bitstream $I_n$, the weight bitstream $I_w$, and the LP coefficients bitstream $I_a$.

The processor of the decoder 200 may output a first quantized latent signal $\hat{z}_p(n)$, a second quantized latent signal $\hat{z}_n(n)$, a quantized weight vector $\hat{w}(n)$, and quantized LP coefficients $\{\hat{a}_i\}$ obtained by de-quantizing the first bitstream $I_p$, the second bitstream $I_n$, the weight bitstream $I_w$, and the LP coefficients bitstream $I_a$, using the first de-quantization layer 240, the second de-quantization layer 245, the third de-quantization layer 250, and the LP coefficients de-quantizer 215, respectively. The weight vector $\hat{w}(n)$ may be split into a first quantized weight vector $\hat{w}_p(n)$ for the first quantized latent signal $\hat{z}_p(n)$ and a second quantized weight vector $\hat{w}_n(n)$ for the second quantized latent signal $\hat{z}_n(n)$.

The processor of the decoder 200 may input the first quantized latent signal $\hat{z}_p(n)$ to the fourth neural network 225 and may allow the fourth neural network 225 to output the first decoded residual signal $\hat{r}_p(n)$ by decoding the first quantized latent signal $\hat{z}_p(n)$.

The processor of the decoder 200 may input the second quantized latent signal $\hat{z}_n(n)$ to the fifth neural network 230 and may allow the fifth neural network 230 to output the second decoded residual signal $\hat{r}_n(n)$ by decoding the second quantized latent signal $\hat{z}_n(n)$.

A encoding and decoding pair of the first neural network 125 and the fourth neural network 225 may have an recurrent autoencoder structure that may effectively encode and decode a periodic component of a residual signal, and a encoding and decoding pair of the second neural network 130 and the fifth neural network 230 may have an feedforward autoencoder structure that may effectively encode and decode a non-periodic component of the residual signal.

For example, the fourth neural network 225 and the fifth neural network 230 may have symmetrical structures with the first neural network 125 and the second neural network 130, respectively, and may share model parameters between symmetrical layers. For example, the first neural network 125 may output a code vector by encoding an input signal using a trained model parameter, and the fourth neural network 225 may output a signal by decoding the code vector using a symmetrical structure with the first neural network 125 and a model parameter shared between symmetrical layers.

The processor of the decoder 200 may reconstruct the residual signal $\hat{r}(n)$ based on the quantized weight vectors $\hat{w}_p(n)$ and $\hat{w}_n(n)$, the first decoded residual signal $\hat{r}_p(n)$ and the second decoded residual signal $\hat{r}_n(n)$, using the residual signal synthesis module 280. For example, the processor of the decoder 200 may reconstruct the residual signal $\hat{r}(n)$ by a weighted sum of the first decoded residual signal $\hat{r}_p(n)$ and the second decoded residual signal $\hat{r}_n(n)$, based on the quantized weight vectors $\hat{w}_p(n)$ and $\hat{w}_n(n)$, using the residual signal synthesis module 280.

$$\hat{r}(n)=\hat{w}_p(n)\hat{r}_p(n)+\hat{w}_n(n)\hat{r}_n(n),\ n=0,\ \ldots,\ (N-1) \quad \text{[Equation 5]}$$

For example, each of the quantized weight vectors $\hat{w}_p(n)$ or $\hat{w}_n(n)$ may have the same dimension with the corresponding decoded residual signal $\hat{r}_p(n)$ or $\hat{r}_n(n)$, may have a different dimension with the corresponding decoded residual signal, or may have a single dimension to apply the common weight for each sample of the corresponding decoded residual signal as a simplest example. In case that the quantized weight vector may have a different dimension with the corresponding decoded residual signal, each element of the quantized weight vector may apply to multiple samples of the decoded residual signal in a block-wise fashion.

In Equation 5, $\hat{w}_p(n)$ or $\hat{w}_n(n)$ denote quantized weight vectors output by de-quantizing the weight bitstream $I_w$ in the third de-quantization layer 250. The processor of the encoder 100 may output the weight bitstream $I_w$ by quantizing the weight vectors $w_n(n)$ using the third quantization layer 150.

Although the weight vector, w(n) output by the third neural network 135 may include two weight vectors, $w_p(n)$ and $w_n(n)$, as shown in FIG. 2, the residual signal $\hat{r}(n)$ may be reconstructed using a single quantized weight vector $\hat{w}(n)$ even when w(n) is a single weight vector output from the third neural network 135, as shown in Equation 6 below. In Equation 6, $\hat{w}(n)$ may be assumed as a weight vector for a first decoded residual signal.

$$\hat{r}(n)=\hat{w}(n)\hat{r}_p(n)+(1-\hat{w}(n))\hat{r}_n(n) \quad \text{[Equation 6]}$$

In Equation 6, $\hat{w}(n)$ denotes a weight vector output by de-quantizing the weight bitstream $I_w$ in the third de-quantization layer 250. The processor of the encoder 100 may output the weight bitstream $I_w$ by quantizing the weight vector w(n) using the third quantization layer 150.

In an example, the processor of the decoder 200 may synthesize an output signal $\hat{x}(n)$ based on the reconstructed residual signal $\hat{r}(n)$ and the quantized LP coefficients $\{\hat{a}_i\}$, using the LP synthesis filter 290 as shown in Equation 7 below.

$$\hat{x}(n) = \hat{r}(n) - \sum_{i=1}^{p} \hat{a}_i \hat{x}(n-i),\ n = 0, \ldots , (N-1) \quad \text{[Equation 7]}$$

An LP synthesis may be a process of generating an signal from a residual signal using LP coefficients. A scheme of LP synthesis is not limited to a specific example, and it is apparent to one of ordinary skill in the art that various schemes of LP synthesis may be applied without departing from the spirit of the present disclosure.

In an example, a training device (not shown) for training a neural network model may train the first neural network 125 through the fifth neural network 230. For example, the first neural network 125 through the fifth neural networks 230 shown in FIGS. 1 and 2 may refer to neural networks trained by the training device.

For example, the training device may include at least one of an LP analysis module (e.g., the LP analysis module 160 of FIG. 1), a quantization module (e.g., the quantization module 170 of FIG. 1), a first neural network module (e.g., the first neural network module 180 of FIG. 1), an de-quantization module (e.g., the de-quantization module 260 of FIG. 1), a second neural network module (e.g., the second neural network module 270 of FIG. 1), a residual signal synthesis module (e.g., the residual signal synthesis module 280 of FIG. 1), or a linear prediction synthesis filter (e.g., the LP synthesis filter 290 of FIG. 1).

In an example, the description of the encoder 100 and/or the decoder 200 of FIG. 2 may be substantially equally applied to the LP analysis module, the quantization module, the first neural network module, the de-quantization module, the second neural network module, the residual signal synthesis module or the LP synthesis filter of the training device. The process in the quantization module and de-quantization module of the training device may be replaced with its approximated process to be differentiable.

In an example, the training device may calculate a loss function based on at least one of reconstruction loss, D between the residual signal r(n) output from the linear prediction analysis filter 120, the reconstructed residual signal $\hat{r}(n)$ output from the residual signal synthesis module 280, or a bit rate loss, R indicating a quantization entropy obtained by the quantization module 170, in a neural network training operation. The training device may train the first neural network 125 through the fifth neural network 230 so that a value of the loss function may be minimized in the neural network training operation.

In an example, the training device may calculate the reconstruction loss D in terms of an error of the reconstructed residual signal $\hat{r}(n)$ with respect to the original residual signal r(n), as shown in Equation 8 below. In Equation 8, $D_{mse}$ denotes a mean squared error (MSE), and $D_{mae}$ denotes a mean absolute error (MAE). The signal distortion D may be calculated as an MSE and an MAE, but is not limited thereto.

$$D_{mse} = \frac{1}{N}\sum_{n=0}^{N-1}\{r(n) - \hat{r}(n)\}^2 \quad \text{[Equation 8]}$$

$$D_{mae} = \frac{1}{N}\sum_{n=0}^{N-1}|r(n) - \hat{r}(n)|$$

The training device may calculate an overall loss function $\mathcal{L}$ as shown in Equation 9 below. In Equation 9, R denotes a bit rate loss as sum of each entropy computed using probability distribution of the first quantized latent signal, the second quantized latent signal, and the quantized weight vector, and $\lambda_{rate}$ and $\lambda_{mse}$ denote hyperparameters as weights for the bit rate loss of R and the reconstruction loss of $D_{mse}$ or $D_{mae}$.

$$\mathcal{L}=\lambda_{rate}R+\lambda_{mse}D_{mse} \quad \text{[Equation 9]}$$

The training device may train the first neural network 125, the second neural network 130, the third neural network 135, the fourth neural network 225, and the fifth neural network 230 to minimize an overall loss function calculated using Equation 9. The training device may include a quantization layer and an de-quantization layer, which are approximated to be differentiable according to a design of a neural network, in a training process. For example, the training device may train the first neural network 125 through the fifth neural network 230 by backpropagating an error calculated as the overall loss function, however, the example embodiments are not limited thereto. For example, when the fourth neural network 225 and the fifth neural network 230 may be designed to have symmetric structure with the first neural network 125 and the second neural network 130, respectively, the training device may perform training by constraining model parameters to be shared between symmetrical layers.

In an example, the encoder 100 or the decoder 200 shown in FIGS. 1 and 2 may encode or decode an input signal using the first neural network 125 through the fifth neural network 230 trained by the training device.

Referring to FIG. 2, the encoder 100 according to various example embodiments may normalize, in advance, intrinsic features of an input signal, such as speech and music, through a spectrally flattening effect resulted from the LP analysis and may output a residual signal. A neural network model, for example, the first neural network 125 through the fifth neural network 230, for encoding and decoding the residual signal may be less sensitive to a change in characteristics of an input signal, and a reconstruction quality of the input signal may be enhanced. For example, the encoder 100 and the decoder 200 according to an example embodiment may resolve a quality degradation problem caused usually by an mismatch between training dataset and testing dataset.

In FIG. 2, a configuration including the first neural network 125, the first quantization layer 140, the first de-quantization layer 240, and the fourth neural network 225 may be referred to as an adaptive codebook neural network for modeling a periodic component of a residual signal. In addition, a configuration including the second neural network 130, the second quantization layer 145, the second de-quantization layer 245, and the fifth neural network 230 may be referred to as a fixed codebook neural network for modeling a non-periodic component of a residual signal.

In an example, the adaptive codebook neural network may perform modeling of a periodic component of a residual signal having a periodic characteristic. The fixed codebook neural network may perform modeling of a non-periodic component of a residual signal having a noisy characteristic.

As shown in FIG. 2, the adaptive codebook neural network (e.g., the configuration including the first neural network 125, the first quantization layer 140, the first de-quantization layer 240, and the fourth neural network 225) and the fixed codebook neural network (e.g., the configuration including the second neural network 130, the second quantization layer 145, the second de-quantization layer 245, and the fifth neural network 230) may have neural network structures with different attributes in an LP analysis framework. For example, the first neural network 125 and the fourth neural network 225 of the adaptive codebook neural network may each include an RNN, and the second neural network 130 and the fifth neural network 230 of the fixed codebook neural network may each include an FNN. Each of the first neural network 125, the second neural network 130, the fourth neural network 225, and the fifth neural network 230 may include a neural network suitable for modeling a desired component of an input signal, to enhance a reconstruction quality of the input signal.

For example, the encoder 100 and the decoder 200 may perform modeling of a residual signal that is output from the LP analysis filter 120 through a dual-path neural network. A dual path may refer to a path for processing a residual signal through the first neural network 125 and the fourth neural network 225, and a path for processing the residual signal through the second neural network 130 and the fifth neural network 230. The encoder 100 and the decoder 200 may reconstruct a residual signal by weighted summing two residual signals (e.g., the first decoded residual signal and the second decoded residual signal) output respectively from the adaptive codebook neural network and the fixed codebook neural network using the quantized weight vector output from the third de-quantization layer 250 depending on signal characteristics.

Figure 3:
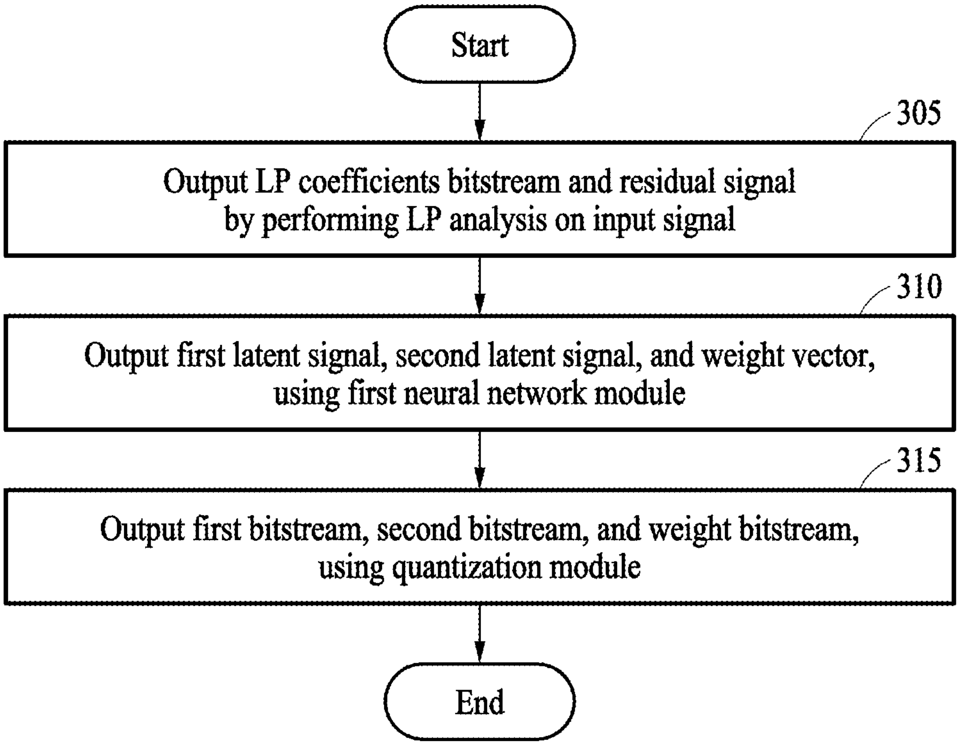
FIG. 3 is a diagram illustrating an example of an operation of an encoding method according to an example embodiment.

FIG. 3 is a diagram illustrating an example of an operation of an encoding method according to an example embodiment.

Referring to FIG. 3, in operation 305, an encoder 100 according to various example embodiments may output LP coefficients bitstream and a residual signal by performing an LP analysis on an input signal.

In operation 310, the encoder 100 may output a first latent signal, a second latent signal, and a weight vector, using a first neural network module 180. For example, a processor of the encoder 100 may input the residual signal to the first neural network module 180. For example, the first latent signal may refer to a code vector obtained by modeling a periodic component of the residual signal, or a code vector obtained by encoding the periodic component of the residual signal. For example, the second latent signal may refer to a code vector obtained by modeling a non-periodic component of the residual signal, or a code vector obtained by encoding the non-periodic component of the residual signal. For example, the weight vector may refer to a set of weights for reconstructing the residual signal in the decoder 200.

In operation 315, the encoder 100 may output a first bitstream, a second bitstream, and a weight bitstream, using a quantization module 170. For example, the quantization module 170 may include a first quantization layer 140, a second quantization layer 145, or a third quantization layer 150.

For example, the encoder 100 may quantize the first latent signal and output the first bitstream, using the first quantization layer 140. For example, the encoder 100 may quantize the second latent signal and output the second bitstream, using the second quantization layer 145. For example, the encoder 100 may quantize the weight vector and output the weight bitstream, using the third quantization layer 150. For example, the encoder 100 may transmit the LP coefficients bitstream output in operation 305, and the first bitstream, the second bitstream, and the weight bitstream that are output in operation 315 to a decoder 200. For example, the encoder 100 may multiplex the LP coefficients bitstream, the first bitstream, the second bitstream, and the weight bitstream, and may transmit the multiplexed bitstream to the decoder 200.

Figure 4:
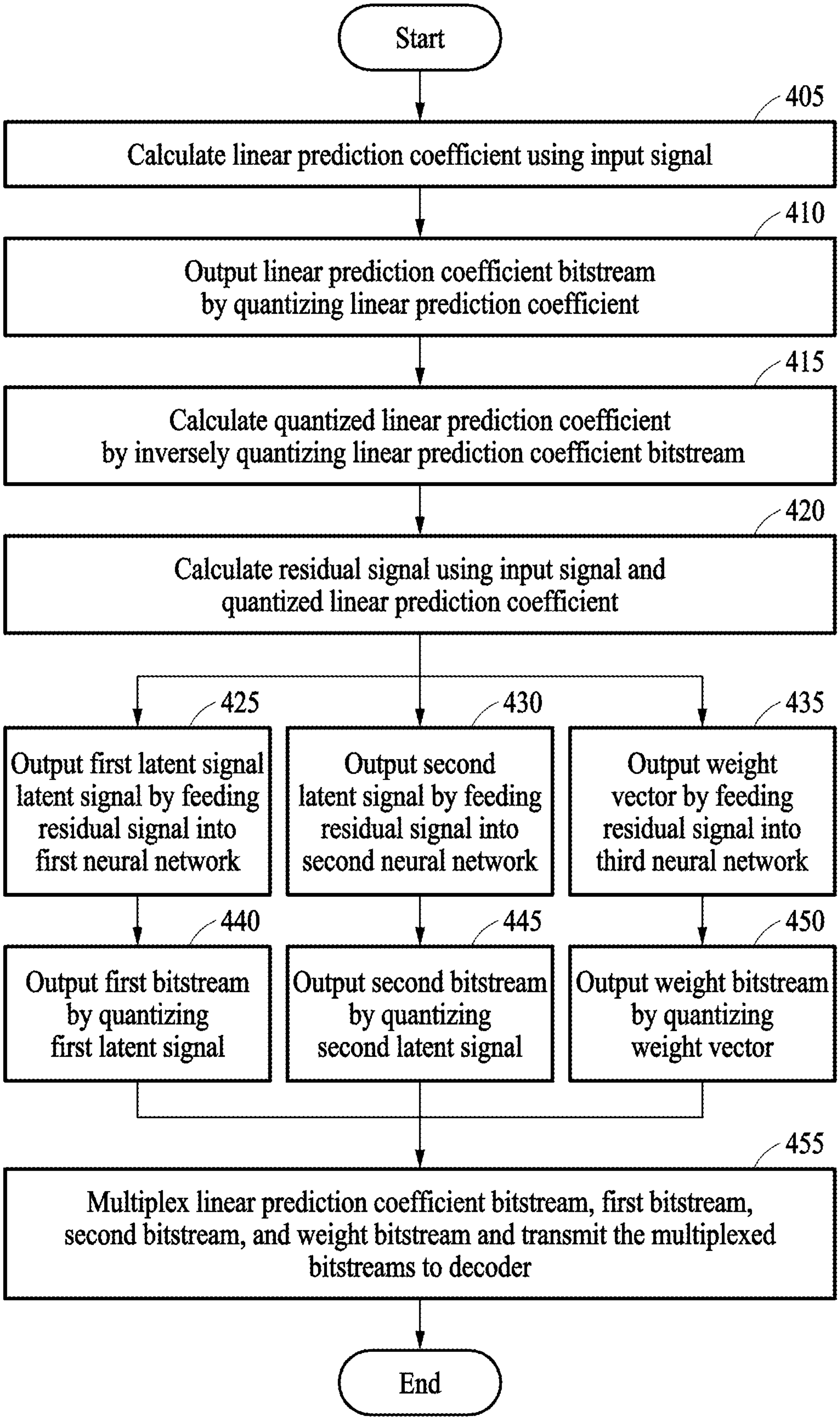
FIG. 4 is a diagram illustrating another example of an operation of an encoding method according to an example embodiment.

FIG. 4 is a diagram illustrating another example of an operation of an encoding method according to an example embodiment.

Referring to FIG. 4, in operation 405, an encoder 100 according to various example embodiments may calculate LP coefficients using an input signal. For example, a processor of the encoder 100 may calculate LP coefficients for each frame corresponding to an analysis unit of the input signal, using LP coefficients calculator 105.

In operation 410, the encoder 100 may output LP coefficients bitstream by quantizing the LP coefficients. For example, the processor of the encoder 100 may input the LP coefficients to LP coefficients quantizer 110 and may allow the LP coefficients quantizer 110 to output the LP coefficients bitstream.

In operation 415, the encoder 100 may calculate quantized LP coefficients by de-quantizing the LP coefficients bitstream. For example, the processor of the encoder 100 may calculate the quantized LP coefficients by de-quantizing the LP coefficients bitstream using LP coefficients de-quantizer 115.

In operation 420, the encoder 100 may calculate a residual signal using the input signal and the quantized LP coefficients.

In operation 425, the encoder 100 may output a first latent signal by inputting the residual signal to a first neural network 125. For example, the first neural network 125 may include an RNN configured to encode a periodic component of the residual signal.

In operation 430, the encoder 100 may output a second latent signal by inputting the residual signal to a second neural network 130. For example, the second neural network 130 may include an FNN configured to encode a non-periodic component of the residual signal.

The first neural network 125 used in operation 425 may refer to an encoder part of an autoencoder having a recurrent structure suitable for modeling a periodic component of a speech signal or an audio signal. The second neural network 130 used in operation 430 may refer to a decoder part of an autoencoder having a feedforward structure suitable for modeling a non-periodic component of a speech signal or an audio signal.

For example, the first latent signal or the second latent signal may be an encoded code vector or bottleneck.

In operation 435, the encoder 100 may output a weight vector by inputting the residual signal to a third neural network 135. For example, the third neural network 135 may include a neural network configured to output a weight vector depending on characteristics of the residual signal. In an example, the weight vector may be associated with weights of the first latent signal and the second latent signal to reconstruct a residual signal.

In operation 440, the encoder 100 may output a first bitstream by quantizing the first latent signal. In operation 445, the encoder 100 may output a second bitstream by quantizing the second latent signal. In operation 450, the encoder 100 may output a weight bitstream by quantizing the weight vector.

For example, the encoder 100 may quantize the first latent signal, the second latent signal, and the weight vector to the first bitstream, the second bitstream, and the weight bitstream, using the first quantization layer 140, the second quantization layer 145, and the third quantization layer 150 of the quantization module 170, respectively.

In operation 455, the encoder 100 may multiplex the LP coefficients bitstream, the first bitstream, the second bitstream, and the weight bitstream and transmit the multiplexed bitstream to a decoder 200.

Figure 5:
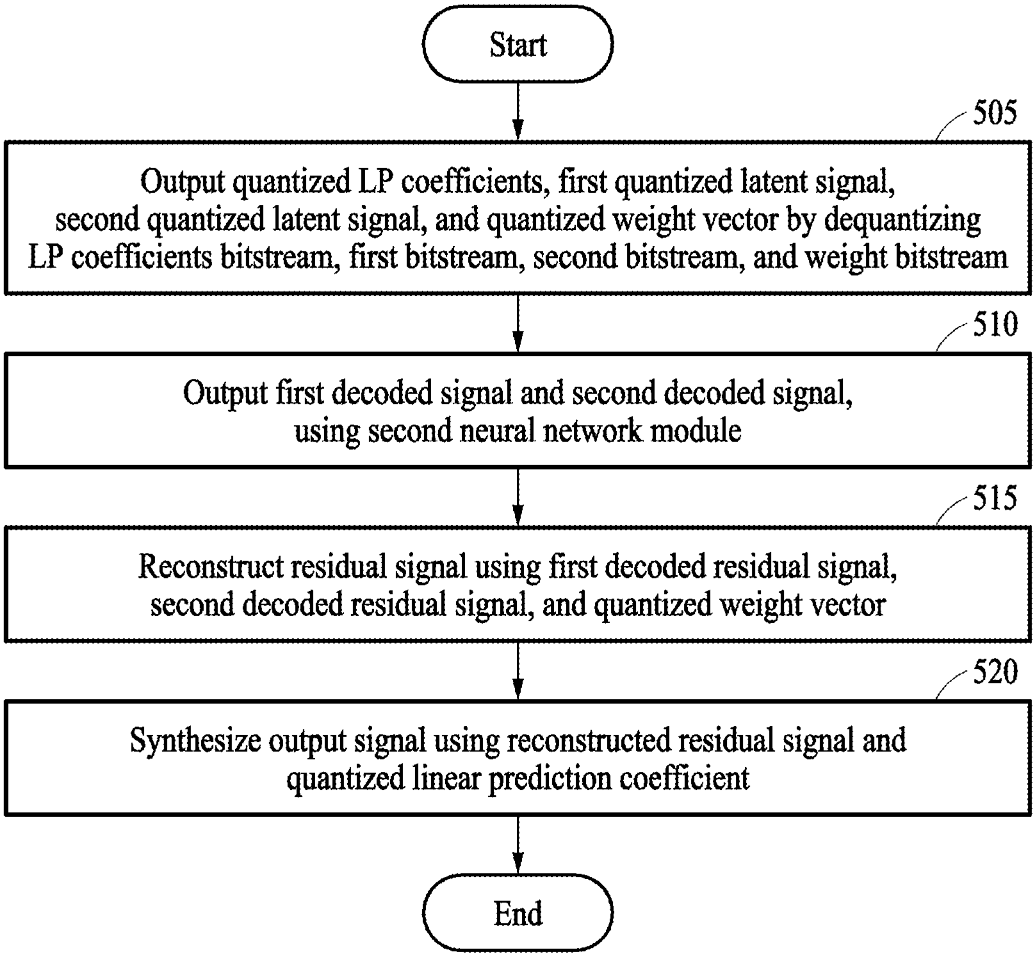
FIG. 5 is a diagram illustrating an example of an operation of a decoding method according to an example embodiment.

FIG. 5 is a diagram illustrating an example of an operation of a decoding method according to an example embodiment.

Referring to FIG. 5, in operation 505, a decoder 200 according to various example embodiments may output quantized LP coefficients, a first quantized latent signal, a second quantized latent signal, and a quantized weight vector by de-quantizing LP coefficients bitstream, a first bitstream, a second bitstream, and a weight bitstream.

In operation 510, the decoder 200 may output a first decoded residual signal and a second decoded residual signal using a second neural network module 270. For example, the second neural network module 270 may include a fourth neural network 225, and a fifth neural network 230. For example, the decoder 200 may input the first quantized latent signal to the fourth neural network 225 to output the first decoded residual signal. For example, the decoder 200 may input the second quantized latent signal to the fifth neural network 230 to output the second decoded residual signal.

In operation 515, the decoder 200 may reconstruct a residual signal using the first decoded residual signal, the second decoded residual signal, and the quantized weight vector. For example, the decoder 200 may reconstruct the residual signal as a weighted sum of the first decoded residual signal and the second decoded residual signal, using the quantized weight vector.

In operation 520, the decoder 200 may synthesize an output signal using the reconstructed residual signal and the quantized LP coefficients. For example, the decoder 200 may generate an audio signal from the reconstructed residual signal using an LP synthesis filter 290 constructed with the quantized LP coefficients. The audio signal generated by the decoder 200 may be an output signal.

Figure 6:
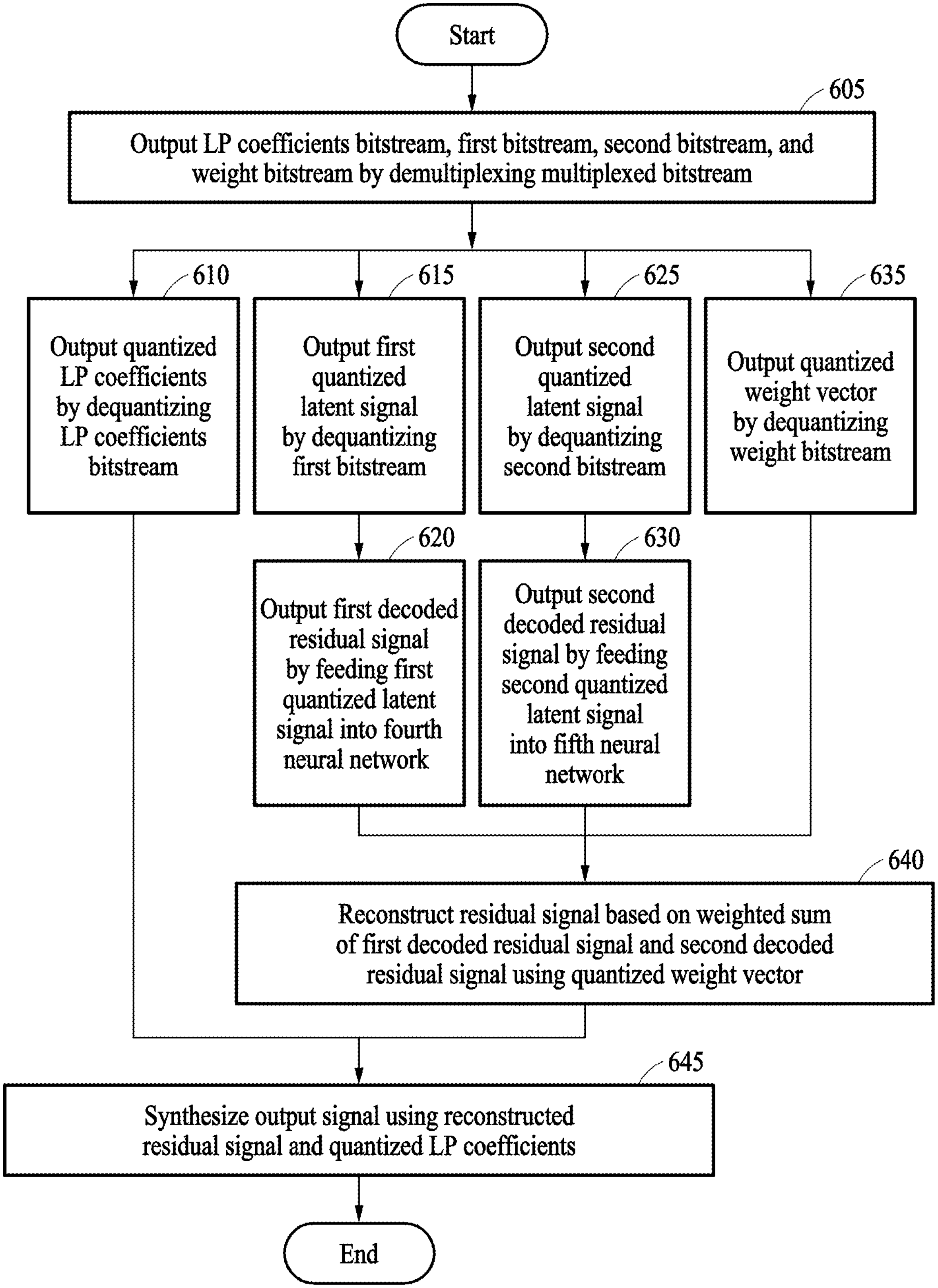
FIG. 6 is a diagram illustrating another example of an operation of a decoding method according to an example embodiment.

FIG. 6 is a diagram illustrating another example of an operation of a decoding method according to an example embodiment.

Referring to FIG. 6, in operation 605, a decoder 200 according to various example embodiments may output LP coefficients bitstream, a first bitstream, a second bitstream, and a weight bitstream by demultiplexing multiplexed bitstreams.

In operation 610, the decoder 200 may output quantized LP coefficients by de-quantizing the LP coefficients bitstream. For example, the decoder 200 may output the quantized LP coefficients obtained by de-quantizing the LP coefficients bitstream using LP coefficients de-quantizer 215.

In operation 615, the decoder 200 may output a first quantized latent signal by de-quantizing the first bitstream. For example, the decoder 200 may output the first quantized latent signal obtained by de-quantizing the first bitstream using a first de-quantization layer 240.

In operation 620, the decoder 200 may output a first decoded residual signal by inputting the first quantized latent signal to a fourth neural network 225.

In operation 625, the decoder 200 may output a second quantized latent signal by de-quantizing the second bitstream. For example, the decoder 200 may output the second quantized latent signal obtained by de-quantizing the second bitstream using a second de-quantization layer 245.

In operation 630, the decoder 200 may output a second decoded residual signal by inputting the second quantized latent signal to a fifth neural network 230.

In operation 635, the decoder 200 may output a quantized weight vector by de-quantizing the weight bitstream. For example, the decoder 200 may output the quantized weight vector obtained by de-quantizing the weight bitstream using a third de-quantization layer 250.

In operation 640, the decoder 200 may reconstruct a residual signal as a weighted sum of the first decoded residual signal and the second decoded residual signal, using the quantized weight vector.

In operation 645, the decoder 200 may synthesize an output signal using the reconstructed residual signal and the quantized LP coefficients.

For example, the decoder 200 may synthesize the reconstructed residual signal based on the first decoded residual signal, the second decoded residual signal, and the quantized weight vector, using a residual signal synthesis module 280. For example, the decoder 200 may synthesize the output signal based on the reconstructed residual signal and the LP coefficients, using a linear prediction synthesis filter 290.

Figure 7:
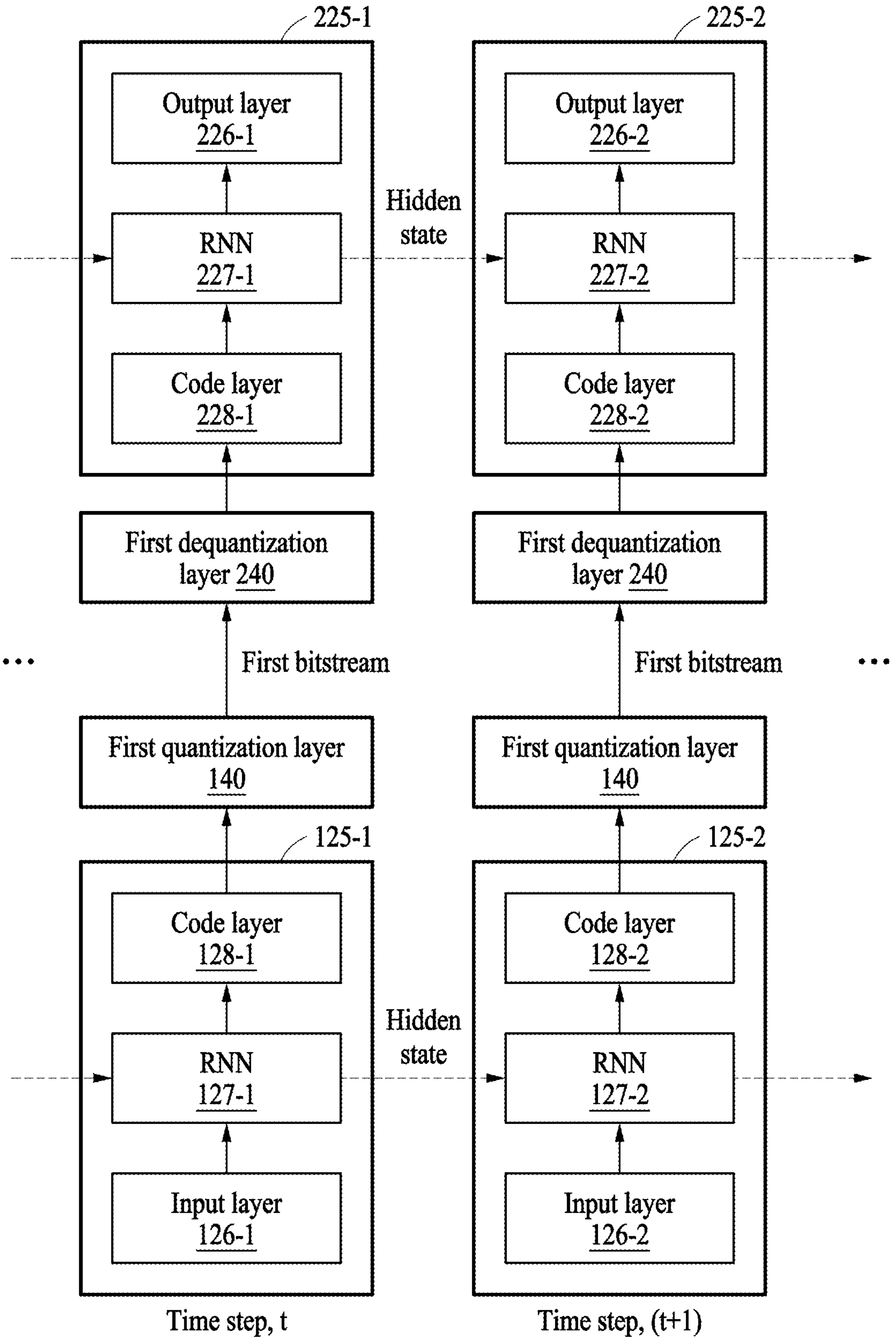
FIG. 7 is a diagram illustrating a first neural network and a fourth neural network, each including a recurrent neural network (RNN), according to an example embodiment.

FIG. 7 is a diagram illustrating first neural networks 125-1 and 125-2 and fourth neural networks 225-1 and 225-2, each including an RNN, according to an example embodiment.

Referring to FIG. 7, the first neural network 125-1, 125-2 according to various example embodiments may include an input layer 126-1, 126-2, an RNN 127-1,127-2, or a code layer 128-1, 128-2. The fourth neural network 225-1, 225-2 according to various example embodiments may include a code layer 228-1, 228-2, an RNN 227-1, 227-2, and an output layer 226-1, 226-2.

FIG. 7 illustrates the first neural networks 125-1 and 125-2 and the fourth neural networks 225-1 and 225-2 at the current time steps t and the next time step (t+1). The first neural networks 125-1 and 125-2 and the fourth neural networks 225-1 and 225-2 may include the RNNs 127-1, 127-2, 227-1, and 227-2, respectively. Each hidden state of the RNN 127-1, 227-1 at the current time step t may be input to the RNN 127-2, 227-2 at the next time step (t+1), respectively.

For example, Each hidden state at the previous time step (t−1), although not shown in FIG. 7, may be input to the RNN 127-1 of the first neural network 125-1 and the RNN 227-1 of the fourth neural network 225-1, respectively. At the current time step t, a residual signal obtained from the LP analysis filter 120 may be the input layer 126-1 of the first neural network 125-1 to output a code vector. The code layer 128-1 may be a code vector, for example, a first latent signal, which is a signal output from the RNN 127-1 of the first neural network 125-1. A first quantization layer 140 may transmit a first bitstream obtained by quantizing the first latent signal to a first de-quantization layer 240. The first de-quantization layer 240 may de-quantize the first bitstream and output the first quantized latent signal corresponding to the code layer 228-1 of the fourth neural network 225-1. The RNN 227-1 of the fourth neural network 225-1 may output a first decoded residual signal corresponding to the output layer 226-1.

In substantially the same manner as operations of the first neural network 125-1 and the fourth neural network 225-1 at the current time step t, hidden states of the RNNs 127-1 and 227-1 at the time step t may be input to the RNN 127-2 of the first neural network 125-2 and the RNN 227-2 of the fourth neural network 225-2 at the next time step (t+1). At the next time step (t+1), the residual signal may be the input layer 126-2 of the first neural network 125-2. The code layer 128-2 may be a code vector, for example, a first latent signal, according to a signal output from the RNN 127-2 of the first neural network 125-2. A first quantization layer 140 may transmit a first bitstream obtained by quantizing the first latent signal to a first de-quantization layer 240. The first de-quantization layer 240 may de-quantize the first bitstream and output the first quantized latent signal corresponding to the code layer 228-2 of the fourth neural network 225-2. The RNN 227-2 of the fourth neural network 225-2 may output a first decoded residual signal corresponding to the output layer 226-2.

As described above, the first neural network 125 and the fourth neural network 225 may include the RNNs 127 and 227, respectively, and the RNNs 127 and 227 may pass each hidden state information at a current time step to RNNs 127 and 227 at a next time step. Since the first neural network 125 and the fourth neural network 225 include the RNNs 127 and 227, respectively, an encoder and a decoder according to an example embodiment may efficiently model a periodic component of a residual signal, for example, a long-term redundancy.

For example, the first neural network 125, the first quantization layer 140, the first de-quantization layer 240, and the fourth neural network 225 may be trained using an end-to-end scheme.

Figure 8:
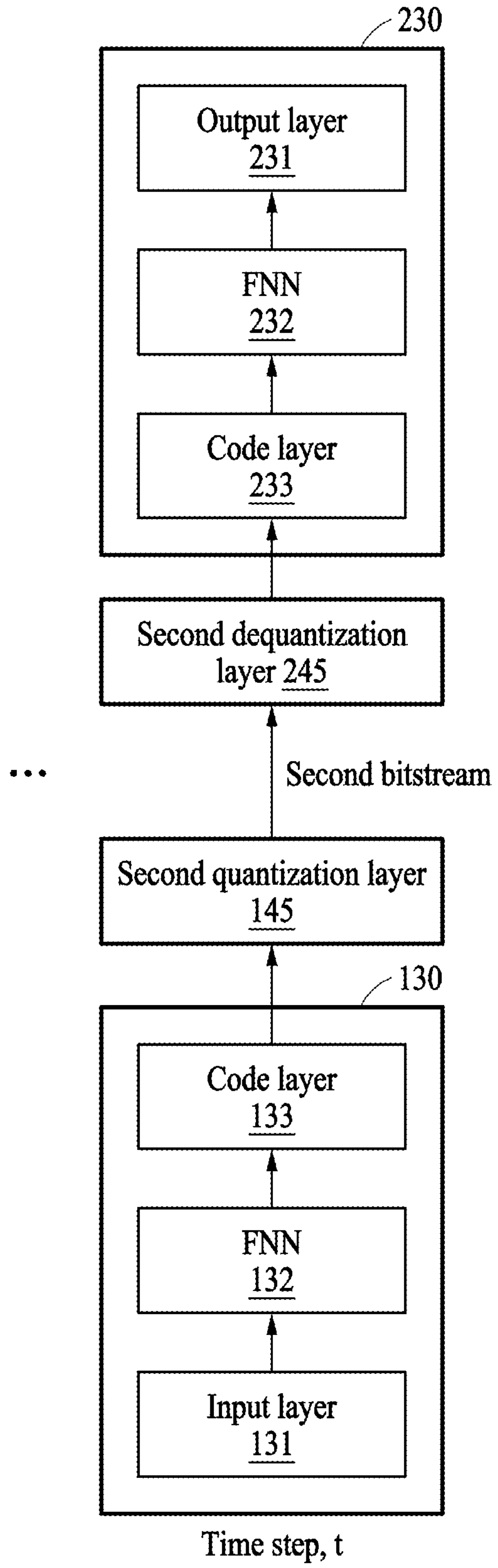
FIG. 8 is a diagram illustrating a second neural network and a fifth neural network, each including a feedforward neural network (FNN), according to an example embodiment.

FIG. 8 is a diagram illustrating the second neural network 130 and the fifth neural network 230 that include FNNs 132 and 232, respectively, according to an example embodiment.

Referring to FIG. 8, the second neural network 130 according to various example embodiments may include an input layer 131, the FNN 132, and a code layer 133. The fifth neural network 230 according to various example embodiments may include a code layer 233, the FNN 232, and an output layer 231.

For example, a residual signal may be the input layer 131 of the second neural network 130 at a current time step t. The code layer 133 may be a code vector, for example, a second latent signal, according to a signal output from the FNN 132 of the second neural network 130. A second quantization layer 145 may transmit a second bitstream obtained by quantizing the second latent signal to a second de-quantization layer 245. The second de-quantization layer 245 may de-quantize the second bitstream and output the second quantized latent signal corresponding to the code layer 233 of the fifth neural network 230. The FNN 232 of the fifth neural network 230 may output a second decoded residual signal corresponding to the output layer 231.

Since the second neural network 130 and the fifth neural network 230 include the FNNs 132 and 232, respectively, an encoder and a decoder according to an example embodiment may efficiently model a non-periodic component of a residual signal, for example, a short-term redundancy.

In an example, the second neural network 130, the second quantization layer 145, the second de-quantization layer 245, and the fifth neural network 230 may be trained using an end-to-end scheme.

As shown in FIGS. 7 and 8, the first neural network 125 and the fourth neural network 225 may include the RNNs 127 and 227, respectively, and the second neural network 130 and the fifth neural network 230 may include the FNNs 132 and 232, respectively. A periodic component of an input signal, for example, a speech signal or an audio signal, may be processed using the first neural network 125 and the fourth neural network 225 that include the RNNs 127 and 227, respectively. A non-periodic component of the input signal may be processed by using the second neural network 130 and the fifth neural network 230 that include the FNNs 132 and 232, respectively. Two decoded residual signals with different attributes may be combined through a gating neural network, for example, including the third neural network 135 to reconstruct a residual signal, and thus an reconstruction quality of the input signal may be enhanced as well as a coding efficiency may be improved.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Implementations of the various techniques described herein may be implemented in digital electronic circuitry, or in computer hardware, firmware, software, or in combinations thereof. Implementations may be implemented as a computer program product, i.e., a computer program tangibly embodied in an information carrier, e.g., in a machine-readable storage device (computer-readable medium), for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory (ROM) or a random access memory (RAM), or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, for example, magnetic media such as hard disks, floppy disks, and magnetic tape, optical media such as compact disc ROMs (CD-ROMs) or digital versatile discs (DVDs), magneto-optical media such as floptical disks, ROMs, RAMs, flash memories, erasable programmable ROMs (EPROMs), or electrically erasable programmable ROMs (EEPROMs). The processor and the memory may be supplemented by, or incorporated in special purpose logic circuitry.

In addition, non-transitory computer-readable media may be any available media that may be accessed by a computer and may include both computer storage media and transmission media.

While the present specification contains many specific implementation details, these should not be construed as limitations on the scope of any disclosure or of what may be claimed, but rather as descriptions of features that may be specific to particular embodiments of particular disclosures. Specific features described in the present specification in the context of individual example embodiments may also be combined and implemented in a single embodiment. On the contrary, various features described in the context of a single embodiment may be implemented in a plurality of example embodiments individually or in any appropriate sub-combination. Moreover, although features may be described above as acting in specific combinations and even initially claimed as such, one or more features from a claimed combination can in some cases be excised from the combination, and the claimed combination may be changed to a sub-combination or a modification of a sub-combination Likewise, although operations are depicted in a predetermined order in the drawings, it should not be construed that the operations need to be performed sequentially or in the predetermined order, which is illustrated to obtain a desirable result, or that all of the shown operations need to be performed. In some cases, multi-tasking and parallel processing may be advantageous. In addition, it should not be construed that the division of various device components of the aforementioned example embodiments is required in all types of embodiments, and it should be understood that the described program components and devices are generally integrated as a single software product or packaged into a multiple-software product.

The example embodiments disclosed in the present specification and the drawings are intended merely to present specific examples in order to aid in understanding of the present disclosure, but are not intended to limit the scope of the present disclosure. It will be apparent to one of one of ordinary skill in the art that various modifications based on the technical spirit of the present disclosure, as well as the disclosed example embodiments, can be made.

What is claimed is:

1. An encoding method comprising:

outputting linear prediction (LP) coefficients bitstream and a residual signal by performing an LP analysis on an input signal;

outputting a first latent signal obtained by encoding a periodic component of the residual signal, using a first neural network:

outputting a second latent signal obtained by encoding a non-periodic component of the residual signal, using a second neural network:

outputting and a weight vector for each of the first latent signal and the second latent signal computed from the residual signal, using a first neural network module; and outputting a first bitstream obtained by quantizing the first latent signal, a second bitstream obtained by quantizing the second latent signal, and a weight bitstream obtained by quantizing the weight vector, using a quantization module, wherein the first neural network comprises a recurrent neural network (RNN) configured to encode a periodic component of the residual signal, wherein the second neural network comprises a feedforward neural network (FNN) configured to encode a non-periodic component of the residual signal.

2. The encoding method of claim 1, wherein the outputting of the LP coefficients bitstream and the residual signal comprises:

calculating LP coefficients using the input signal;

outputting the LP coefficients bitstream by quantizing the LP coefficients;

determining quantized LP coefficients by de-quantizing the LP coefficients bitstream; and calculating the residual signal by feeding the input signal into an LP analysis filter constructed by the quantized LP coefficients.

3. The encoding method of claim 1, wherein the outputting of the weight vector comprises:

outputting the weight vector obtained by feeding the residual signal into a third neural network.

4. The encoding method of claim 3, wherein the third neural network comprises a neural network configured to output a weight vector according to characteristics of the residual signal.

5. A decoding method comprising:

outputting quantized LP coefficients, a first quantized latent signal, a second quantized latent signal, and a quantized weight vector by de-quantizing LP coefficients bitstream, a first bitstream, a second bitstream, and a weight bitstream, respectively using a de-quantization module;

outputting a first decoded residual signal obtained by decoding the first quantized latent signal, using a fourth neural network:

outputting a second decoded residual signal obtained by decoding the second quantized latent signal, using a second neural network module, using a fifth neural network;

reconstructing a residual signal using the first decoded residual signal, the second decoded residual signal, and the quantized weight vector; and synthesizing an output signal by feeding the reconstructed residual signal into an LP synthesis filter constructed by the quantized LP coefficients, wherein the fourth neural network comprises a recurrent neural network (RNN) configured to decode a periodic component of the residual signal, wherein the fifth neural network comprises a feedforward neural network (FNN) configured to decode a non-periodic component of the residual signal.

6. The decoding method of claim 5, wherein the reconstructing of the residual signal comprises outputting the reconstructed residual signal based on a weighted sum of the first decoded residual signal and the second decoded residual signal, using the quantized weight vector.

7. An encoder comprising:

a processor, wherein the processor is configured to:

output LP coefficients bitstream and a residual signal by performing an LP analysis on an input signal, using an LP analysis module;

output a first latent signal obtained by encoding a periodic component of the residual signal, using a first neural network;

output a second latent signal obtained by encoding a non-periodic component of the residual signal, using a second neural network, output a weight vector for each of the first latent signal and the second latent signal, using a first neural network module; and output a first bitstream obtained by quantizing the first latent signal, a second bitstream obtained by quantizing the second latent signal, and a weight bitstream obtained by quantizing the weight vector, using a quantization module wherein the first neural network comprises a recurrent neural network (RNN) configured to encode a periodic component of the residual signal, wherein the second neural network comprises a feedforward neural network (FNN) configured to encode a non-periodic component of the residual signal.

8. The encoder of claim 7, wherein the processor is configured to:

calculate LP coefficients for the input signal, using LP coefficients calculator;

output the LP coefficients bitstream by quantizing the LP coefficients using an LP coefficients quantizer;

output quantized LP coefficients by de-quantizing the LP coefficients bitstream using an LP coefficients de-quantizer; and calculate the residual signal by feeding the input signal into an LP analysis filter constructed by the quantized LP coefficients.

9. The encoder of claim 7, wherein the processor is configured to:

output the weight vector obtained by feeding the residual signal into a third neural network.

10. The encoder of claim 9, wherein the third neural network comprises a neural network configured to output a weight vector according to characteristics of the residual signal.

* * * * *